United States Patent [19]
Kielbania et al.

[11] Patent Number: 5,945,473
[45] Date of Patent: Aug. 31, 1999

[54] MODIFIED AQUEOUS POLYURETHANE DISPERSIONS AND METHODS FOR MAKING SAME

[75] Inventors: Andrew J. Kielbania, Chalfont, Pa.;
Joseph G. Kleiner, Edison, N.J.;
Michael T. Sarkis, Racine, Wis.;
Antonios Tontisakis, Englewood Cliffs;
Sharon P. Lee, Edison, both of N.J.

[73] Assignee: National Starch and Chemical Investment Holding Corporation, Wilmington, Del.

[21] Appl. No.: 08/908,100

[22] Filed: Aug. 11, 1997

Related U.S. Application Data

[63] Continuation of application No. 08/650,070, May 17, 1996, which is a continuation-in-part of application No. 08/476,391, Jun. 7, 1995, abandoned.

[51] Int. Cl.$^6$ .............................. C08J 3/00; C08K 3/20; C08L 75/00; C08F 8/30
[52] U.S. Cl. .................. 524/457; 428/423.1; 524/507; 524/591; 524/839; 524/840; 525/123; 525/127; 525/455
[58] Field of Search .................... 524/457, 507, 524/591, 839, 840; 525/123, 127, 455; 428/423.1

[56] References Cited

U.S. PATENT DOCUMENTS

| | | | |
|---|---|---|---|
| 4,644,030 | 2/1987 | Loewrigkeit et al. | 524/457 |
| 4,927,876 | 5/1990 | Coogan et al. | 524/457 |
| 5,037,700 | 8/1991 | Davis | 428/414 |
| 5,055,516 | 10/1991 | Fisch et al. | 524/541 |
| 5,137,961 | 8/1992 | Goos et al. | 524/457 |
| 5,173,526 | 12/1992 | Vijayendran et al. | 524/457 |
| 5,231,130 | 7/1993 | Wallon et al. | 524/500 |
| 5,270,383 | 12/1993 | Fisch et al. | 524/812 |
| 5,371,133 | 12/1994 | Stanley | 524/457 |

FOREIGN PATENT DOCUMENTS

| | | | |
|---|---|---|---|
| 2081414 | 10/1992 | Canada . | |
| 0 308 115 A2 | 3/1989 | European Pat. Off. | C08F 283/00 |
| WO 89/10380 | 11/1989 | WIPO | C08K 5/00 |

OTHER PUBLICATIONS

George Odian, "Principles of Polymerization", Third Edition, 1991, pp. 1–10, John Wiley & Sons, Inc.

Encyclopedia of Polymer Science and Engineering, "A Wiley–Interscience publication" 1964; vol. 1 (pp. 470–471); vol. 4 (pp. 118–119); vol. 16 (p. 833).

*Primary Examiner*—Patrick D. Niland
*Attorney, Agent, or Firm*—William K. Wissing; Lydia T. McNally

[57] ABSTRACT

The invention relates to methods of preparing aqueous polymeric dispersions which contain a water-dispersible polyurethane, a polymer prepared from an ethylenically unsaturated monomer and at least one additional polymer which is capable of enhancing certain properties of products which utilize the aqueous dispersions of the present invention, wherein the ethylenically unsaturated monomer is polymerized in the presence of the water-dispersible polyurethane dispersion and the additional polymer and in the absence of a surfactant and an organic solvent, to aqueous compositions containing the aqueous polymeric dispersions and to articles of manufacture prepared from the aqueous compositions containing the aqueous polymeric dispersions.

7 Claims, No Drawings

MODIFIED AQUEOUS POLYURETHANE DISPERSIONS AND METHODS FOR MAKING SAME

This application is a continuation of application Ser. No. 08/650,070, filed on May 17, 1996 which is a continuation-in-part of application Ser. No. 08/476,391 filed on Jun. 7, 1995, now abandoned.

FIELD OF THE INVENTION

This invention relates to aqueous polymeric dispersions containing a water-dispersible polyurethane, a polymer prepared from an ethylenically unsaturated monomer and at least one additional polymer which can enhance certain properties of products which utilize the aqueous dispersions of the present invention.

BACKGROUND OF THE INVENTION

Traditionally, aqueous-based polymer dispersions have been prepared via well known techniques such as suspension polymerization, emulsion polymerization, charge neutralization and high impact agitation, such as microfluidization. However, many of these techniques suffer from drawbacks, such as the need for stabilizers which can detract or minimize the effectiveness of the final product, large particle size, high viscosity or poor long term stability.

There has been much effort expended to develop aqueous polymeric dispersions which are comparable in performance to solvent-based polymeric products. When designing such aqueous polymer systems, one factor to consider is the fact that different polymers exhibit different degrees of performance and exhibit specific types of properties. Hence ideally, a combination of polymers may be preferred to achieve the required properties for any particular application.

Two-component, aqueous-based polymer dispersions have been developed in an effort to reduce the amount of volatile organic solvents, which solvents are both economically and environmentally undesirable. However, it has not been possible to obtain products utilizing such polymer dispersions which possess all or most of the properties obtained from solvent-based products, such as bond and tensile strength, chemical and water resistance, heat resistance, gloss and abrasion resistance.

One approach to overcoming some of the above mentioned deficiencies is to blend various polymers such that the properties required for a final application are achieved. Blending of polymers is a well known technique. However, polymer blend ing is subject to many limitations such as chemical thermodynamic and kinetic limitations, and morphology problems leading to phase separation, high viscosity, and inhomogeneous dispersions or gelation/coagulation. The phenomena becomes more difficult when either more than two types of polymers are blended or when the molecular weight of the polymers is too high.

Blending of polymers in the form of homogeneous aqueous dispersions requires a sizeable amount of surfactant-based stabilizers a nd emulsifiers. These surfactants are normally very hydrophilic in nature and tend to remain in the final product. One adverse effect caused by the presence of the surfactant in the final product is a reduction in the bond strength and resistance properties. Additionally, surfactants are low molecular weight species which are easily extracted from polymers. This is detrimental particularly in certain end-use applications such as in direct or indirect food applications. Surfactants also are surface active agents and therefore tend to accumulate at substrate interfaces, thereby limiting the ultimate adhesive performance. Another drawback is the large particle size of the dispersed phase that results in poor film clarity and poor long term stability.

For one t o both manufacture and blend polymers involves preparing the polymers separately and then blending them together, in which case the process is separated into many parts and becomes very uneconomical and cumbersome. Blending of only commercially available polymers will result in a limited choice of materials, as well as little or no control over the properties of the polymers. In addition, the performance required of such polymeric substances when used on various substrates in end-uses such as adhesives, binders, coatings, sizes, saturants and sealants, especially with the advent of new types of difficult-to-adhere substrates and stringent application conditions.

It is well recognized that waterborne urethane/vinyl emulsions can be prepared for use in aqueous compositions such as those noted above, with the advantage over earlier systems of being essentially free of volatile organic compounds. Methods of obtaining similar urethane-acrylic copolymers are also known where chain-termination of the polyurethane prepolymer is conducted with a $C_1$–$C_4$ alkyl alcohol to obtain only urethane linkages (i.e., urea-free linkages) in the final dispersion, thus leading to clearer films or coatings. However, these systems by themselves have some limitations. For example, in the field of flexible laminating adhesives, the adhesion properties and barrier to chemicals and solvents of the aqueous compositions typically are inferior to solvent-based systems.

Free-radical polymerization of vinyl monomers in the presence of a seed polymer is a well known emulsion polymerization technique. Here, the seed polymer can be of any nature, but the seed polymer is prestabilized with surfactants. The final product also contains a substantial amount of surfactant to maintain the stability of the product, which in turn adversely affects the final performance.

The incorporation of a phenol/formaldehyde condensation resin or an epoxy resin during the preparation of an aqueous polyurethane dispersion is also known. However, here the polyurethane prepolymer is prepared in a water-miscible low boiling solvent. Again, the presence of a solvent is detrimental both economically and environmentally. Typically, additional processing is required to strip away the solvent.

There is a growing need to develop aqueous polyurethane dispersions which have certain improved properties over dispersions thus far known in the art. As noted above, one of the major problems of combining polymers is their incompatibility or inhomogeneity. It would be desirable to provide an aqueous polymeric dispersion and methods for making same which will not be subject to one or more of the disadvantages of the prior art noted above.

This invention overcomes the problems of blending more than two polymers. At the same time, the methods for preparing the polymer dispersions allows for designing of a polymeric system for specific end-use applications. The polymer dispersions according to the present invention provide comparable or better performance than that of a solvent-based system. The present invention also provides several unexpected improvements in properties attributable to the choice of the polymeric performance enhancers being incorporated into a polyurethane/vinyl polymer.

SUMMARY OF THE INVENTION

The invention is directed to processes for preparing aqueous polymeric dispersions, wherein an aqueous dispersion of water-dispersible polyurethane, an ethylenically unsaturated monomer and at least one polymeric performance enhancer are contacted in the presence of water and under conditions effective to polymerize the ethylenically unsaturated monomer. The contacting step is conducted in the absence of a surfactant and in the absence of an organic solvent, as those terms are defined herein. The polymeric performance enhancer is non-reactive with the polyurethane and the ethylenically unsaturated monomer under the conditions which are effective to polymerize the ethylenically unsaturated monomer. The invention also is directed to aqueous dispersions which are prepared by the processes of the present invention. The invention is also directed to aqueous compositions which contain the aqueous dispersions of the present invention and articles of manufacture prepared utilizing the aqueous compositions containing the aqueous polymeric dispersions.

DETAILED DESCRIPTION OF THE INVENTION

The water-dispersible polyurethane may be prepared by any known method. The water-dispersible polyurethane is prepared by reacting (i) an aromatic or aliphatic polyisocyanate with (ii) an organic compound having at least two active hydrogen atoms and (iii) a hydrophilic organic compound containing at least two active hydrogen atoms in a sufficient amount to render the resulting polyurethane dispersible in water without the use of a surfactant. As used herein, "water-dispersible polyurethane" means those polyurethanes which may be dispersed in water without the aid or use of a surfactant. As used herein, "surfactant" means a water-soluble compound which lowers the surface tension of aqueous solutions. Surfactant, as used herein, specifically excludes the water-dispersible polyurethane used in the preparation of the aqueous polyurethane dispersion. Exemplary surfactants are found in McCutcheon's 1995, Volume 1: Emulsifiers & Detergents.

The term "active hydrogen atom" refers to hydrogens which, because of their position in the molecule, display activity according to Zerewitinoff test, J. Amer. Chem. Soc. 49, 3181 (1927), including hydrogens attached to oxygen, sulfur and/or nitrogen, as in the groups —OH, —SH, =NH, and $NH_2$. The polyurethane can be prepared neat or within an ethylenically unsaturated monomer which is capable of free-radical polymerization.

The aromatic or aliphatic polyisocyanates preferably are diisocyanates, such as, methylene-diphenyl diisocyanate, methylene-bis(4-cyclohexyl-isocyanate), isophorone diisocyanate, toluene diisocyanate, 1,5-naphthalene diisocyanate, 4,4'-diphenyl-methane diisocyanate, 2,2'-dimethyl-4,4'-diphenyl-methane diisocyanate, 4,4'-dibenzyl-diisocyanate, 1,3-phenylene diisocyanate, 1,4-phenylene diisocyanate, mixtures of 2,4- and 2,6-toluene diisocyanate, 2,2'-dichloro-4,4'-diisocyanato diphenylmethane, 2,4-dibromo-1,5-diisocyanato naphthalene, butane-1,4-diisocyanate, hexane-1,6-diisocyanate, and cyclohexane-1,4-diisocyanate.

Blocked isocyanates which release free isocyanate groups at higher temperatures are also useful and include, without limitation, dimeric-2,4-tolylene diisocyanate, and polyisocyanates which have had their isocyanate groups blocked with, for example, phenol, tert-butanol, phthalimide, caprolactam, and the like. Generally, the preferred useful blocked polyisocyanates are the diisocyanates; however, small amounts of triisocyanates and those of higher functionality may be used, provided their use does not cause gelling of the polymerization mixture.

The organic compounds which are reactive with isocyanate and which may be used for the preparation of the polyurethane polymers have at least two active hydrogen atoms. These compounds will have a number average molecular weight of about 300 to 20,000, preferably about 400 to 5,000. Preferably, these organic compounds will be linear in order to prevent gelling during polymerization, but small amounts of non-linear compounds may be used provided their use does not cause gelling. Suitable polyol compounds preferably have a number average molecular weight of about 400 to 5,000, and an average OH value of about 10 to about 1,000, preferably about 30 to about 150, as determined by ASTM E222-67, Method B.

The polyhydroxy compounds will comprise compounds such as polyether diols, polyether/polyester diols, polyester diols, polyacetal diols, polyamide diols, polyester polyamide diols, poly(alkylene ether)diols, polythioether diols, and polycarbonate diols. It is preferred to use difunctional compounds, although small amounts of tri-(and greater) functional compounds may be used.

Suitable polyether diols are, for example, the condensation products of ethylene oxide. propylene oxide, butylene oxide, or tetrahydrofuran, and their copolymerization, graft or block polymerization products, such as, mixed ethylene oxide, propylene oxide condensates, and the graft polymerization products of the reaction of olefins under high pressure with the mentioned alkylene oxide condensates. Suitable polyethers are prepared by the condensation of the mentioned alkylene oxides with polyhydric alcohols, such as, ethylene glycol, 1,2-propylene glycol and 1,4-butanediol.

Suitable polyester diols, polyester amide diols, and polyamide diols are preferably saturated, and are obtained, for example, from the reaction of saturated or unsaturated polycarboxylic acids with saturated or unsaturated polyhydric alcohols. Suitable carboxylic acids for preparing these compounds include, for example, adipic acid, succinic acid, phthalic acid, terephthalic acid, and maleic acid. Suitable polyhydric alcohols for preparing the polyester diols include, for example, ethylene glycol, 1,2-propylene glycol, 1,4-butanediol, neopentyl glycol, hexanediol, and trimethylolpropane. A suitable amino alcohol for preparing polyester amide diols is, for example, ethanolamine. Suitable diamines for preparing polyesteramide diols and polyamide diols are, for example, ethylene diamine and hexamethylene diamine.

Suitable polyacetals can be prepared, for example, from 1,4-butanediol or hexanediol and formaldehyde. Suitable polythioether diols can be prepared, for example, by the condensation of thiodiglycol with ethylene oxide, propylene oxide, butylene oxide or tetrahydrofuran. Polyhydroxy compounds that already contain urethane groups, and natural polyols, which may be further modified, for example, castor oil and carbohydrates, may also be used.

In order to produce a water-dispersible polyurethane, it is necessary to incorporate hydrophilic functionality into the polymer chain. This may be done by the incorporation of a variety of nonionic, anionic, cationic, or amphoteric hydrophilic moieties, or mixtures of them, into an organic compound having at least two active hydrogen atoms, and reacting that compound (together with the above described organic compounds having no hydrophilic functionality) with a diisocyanate as described above to form the polyurethane. Preferably, this is done by the method taught in U.S. Pat. No. 4,061,618, which involves the incorporation of 2% to 12% by weight of the urethane polymer of nonionic moieties derived from polyethylene glycol.

The polyethylene glycols used preferably are those that are available commercially and produced by the reaction of ethylene oxide with water, ethylene glycol, or diethylene glycol in the presence of sodium hydroxide as a catalyst. These polyethylene glycols are characterized by the structure: $H(OCH_2CH_2)_XOH$, in which X is an integer from 13 to about 450, preferably from about 90 to 136. These polyethylene glycols have number average molecular weights of about 600 to 20,000, preferably about 4,000 to 8,000. A polyethylene glycol that is homogeneous in molecular weight, or a mixture of polyethylene glycols that differ in molecular weight can be used. It is also possible to copolymerize small amounts of additional alkylene oxides into the polyethylene glycol provided that the hydrophilic nature of the glycol is not destroyed.

Anionic polyurethanes are prepared which contain from about 2 to about 50 weight percent of a radical selected from the group consisting of carboxylic, sulfonate, sulfonic acid, phosphate, sulfate and phosphate ester. Diols and triols which contain carboxyl groups are preferred, with 2,2-dimethylolpropionic acid being particularly preferred. Cationic polyurethanes are prepared which contain ammonium and sulfonium groups.

In preparing the polyurethane polymer, in addition to the organic compound having at least two active hydrogen atoms, which in many cases is a high molecular weight compound, it may be desirable to chain extend the polyurethane using an organic compound with a lower number average molecular weight, preferably less than 500 and greater than 16. The active-hydrogen-containing chain extender which is reacted with the prepolymer is suitably a polyol, an amino alcohol, ammonia, a primary or a heterocyclic amine, especially a diamine, or $H_2O$.

Examples of suitable chain extenders include hydrazine, ethylenediamine, diethylene triamine, triethylene tetramine, propylene diamine, butylene diamine, butylene diamine, hexamethylene diamine, cyclohexylene diamine, piperazine, 2-methyl piperazine, phenylene diamine, toluene diamine, tris(2-aminoethyl)amine, 4,4'-methylenebis(2-chloroaniline), 3,3'-dichloro-4,4'-diphenyl diamine, 2,6-diaminopyridine, 4,4'-diaminophenyl methane, isophorone diamine.

If it is desired not to chain extend the polymer, the reaction of the diisocyanate with the organic compound having two active hydrogen atoms and the hydrophilic organic compound is quenched by the addition of an alcohol or ammonia to consume any residual isocyanate functionality The preparation of the polyurethane may be conducted neat or may be conducted in any ethylenically unsaturated monomer which is capable of free-radical polymerization. When the preparation of the polyurethane is conducted in an ethylenically unsaturated monomer, such monomer should be selected so that the resultant urethane polymer will be soluble in that monomer. Examples of ethylenically unsaturated monomers include, without limitation, α,β-ethylenically unsaturated mono- and dicarboxylic acids such as acrylic acid, methacrylic acid, maleic acid, and itaconic acid, vinyl esters of alkanoic acids having from 1 to about 18 carbon atoms, such as vinyl formate, vinyl acetate, vinyl propionate, vinyl butyrate, vinyl isobutyrate, vinyl valerate, vinyl 2-ethylhexanoate, vinyl isooctanoate, vinyl nonoate, vinyl decanoate, vinyl pivalate, vinyl ester (e.g., Versatic Acid™, a branched carboxylic acid, marketed by the Shell Oil Corporation), vinyl laurate, and vinyl stearate; also alpha-olefins, such as ethylene, propylene, butylene, isobutylene and pentene and the like; also maleate, fumarate, and itaconate esters of $C_1$–$C_8$ alcohols, such as dibutyl maleate, dibutyl fumarate, dibutyl itaconate; also alkyl acrylates with an alkyl group having from 1 to 18 carbon atoms, such as methyl, ethyl, n-butyl, isobutyl, sec-butyl, the various isomeric pentyl, hexyl, heptyl, and octyl (especially 2-ethylhexyl), lauryl, cetyl, stearyl and the like groups; also alkyl esters of methacrylic acid with an alkyl group having from 1 to about 18 carbon atoms, such as methyl, ethyl, propyl, n-butyl, isobutyl, n-hexyl, 2-ethylhexyl, n-octyl, lauryl, cetyl, stearyl and like groups; also vinyl alkyl ethers, having an alkyl group with 1 to 18 carbon atoms, such as methyl vinyl ester, ethyl vinyl ether, butyl vinyl ether and stearyl vinyl ether. Examples of monomers also include diene monomers, such as butadiene, chloroprene, and isoprene and similar compounds. Other monomers include aromatic vinyl monomers, such as styrene, a-methylstyrene, vinyl toluene, 2-bromostyrene, and p-chlorostyrene; also nitriles of α,β-ethylenically unsaturated carboxylic acids such as acrylonitrile and methacrylonitrile; also vinyl halide monomers, such as vinyl chloride and vinylidene chloride; also benzyl acrylate and t-butyl acrylate; also vinyl esters of aromatic acids, such as vinylbenzoate. Additional ethylenically unsaturated monomers include amides of α,β-ethyienically unsaturated acids such as acrylamide, methacrylamide, maleic acid amide and maleic acid imide, also substituted amides of unsaturated carboxylic acids such as methylol acrylamide and methylol methacrylamide; also vinyl amides such as vinyl-formamide and vinyl acetamide; also heterocyclic vinyl monomers such as vinyl pyridine and vinyl pyrrolidone; also glycidylmethacrylate and glycidylacrylate. Other monomers which may be used include hydroxyalkyl esters of (meth)acrylic acids such as hydroxyethyl(meth)acrylate and hydroxypropyl(meth) acrylates. Other monomers include glycerolmono(meth) acrylate.

Preferred ethylenically unsaturated monomers include (meth)acrylates, hydroxyalkyl(meth)acrylates, glycidol (meth)acrylates, glycerolmonoethyl(meth)acrylates, (meth) acrylic acids, vinyl esters, monoalkylmaleates, dialkylmaleates, olefins, N-methylolmethacrylate, acrylonitrile, N-vinyl formamide and N-vinyl pyrrolidone.

The aqueous dispersions of the present invention will also include at least one polymeric performance enhancer (PPE). PPE, as used herein, refers to a polymer which is contacted simultaneously with an aqueous dispersion of the water-dispersible polyurethane and the ethylenically unsaturated monomer under conditions effective to polymerize the ethylenically unsaturated monomer. The presence of the PPE enhances one or more properties of an aqueous composition which contains the aqueous dispersions of the present invention. The PPE may be selected based on the particular property of concern; for example, tensile and bond strength and chemical or water resistance. The PPE is also selected such that it preferably is soluble in the ethylenically unsaturated monomer. The PPE is non-reactive with both the polyurethane and the ethylenically unsaturated monomer when contacted therewith under conditions which are effective to polymerize the ethylenically unsaturated monomer, thereby providing an aqueous dispersion containing at least three discrete polymeric components. The PPE is insoluble in water and is not dispersible itself in water without the aid or use of a surfactant. The PPE may be either thermoplastic or thermoset and, while preferably being non-reactive with the polyurethane and ethylenically unsaturated monomer as discussed above, may be curable or reactable subsequent to the polymerization of the ethylenically unsaturated monomer.

The PPE may be prepared by addition polymerization techniques, defined by IUPAC as polymerization by a repeated addition process, i.e., monomer units are added so that the resulting chain is a perfect sum of all the atoms in the monomers. Representative addition polymers useful as PPEs include, without limitation, synthetic and natural hydrocarbon resins such as petroleum-based products and waxes, polyethylene, polyisobutylene, ethylene/acrylic acid copolymers, polyacrylonitrile, polyvinyl chloride, polystyrene, poly(meth)acrylates, polyvinyl acetate, polyvinylidene chloride, polybutadiene, polyacrylonitrile/butadiene/styrene terpolymer, vinyl/acrylic copolymer, styrene/(meth)acrylate copolymers, polychloroprene, polyisoprene, styrene/butadiene copolymers, ethylene/vinyl acetate copolymers, styrene/isoprene copolymers, styrene/maleic anhydride copolymers, and acrylonitrile/(meth)acrylate copolymers. Also included are polyvinylpyrrolidone, polyvinylacetate/N-vinyl formamide copolymers, polyvinyl ethers and ethylene/vinylchloride copolymers.

In addition, naturally occurring polymers such as rosin acids, rosin esters and terpene phenolics, may be used PPEs. Further polymers may be prepared from the rosin acids, rosin esters and phenolic esters via condensation polymerization, if desired. In addition natural rubbers, epoxidized-rubbers and other functionalized rubbers may be used as PPEs.

The PPEs may also be prepared by condensation polymerization techniques, defined by IUPAC as polymerization by a repeated condensation process, i.e., with elimination of simple molecules. Representative condensation polymers useful as PPEs include, without limitation, polyesters, amino resins, epoxy resins, furan polymers, polyacetals, poly(alkylene sulfide)s, polyamides, polyamines, polyaminotriazoles, polyanhydrides, polycarbonates, polyhydrazines, polyimides, polyquinoxalines, polysaccharides, polysulfides, polyureas, proteins, silicones, polyurethanes, phenol formaldehyde, urea formaldehyde and melamine formaldehyde. Those polyurethanes which may be used as PPEs do not include functional groups which would render the polyurethane PPEs soluble in water. Such functional groups include, for example, carboxylic acid, sulfonic acid or phosphoric acid groups and quaternary nitrogen. The water-dispersible polyurethanes used to prepare the aqueous polyurethane dispersions are self-dispersing in water and may contain functional groups which would render the polyurethanes soluble in water. As such, the polyurethanes used to prepare the aqueous polyurethane dispersions and the polyurethanes utilized as PPEs are mutually exclusive.

Preferred PPEs include hydrocarbon resins, ethylene/acrylic acid copolymers, polyacrylonitrile, polyvinyl chloride, polystyrene, poly(meth)acrylates, polyvinyl acetate, polyvinylidene chloride, polybutadiene, polyacrylonitrile/butadiene/styrene terpolymer, vinyl/acrylic copolymer, styrene/(meth)acrylate copolymers, polychloroprene, polyisoprene, styrene/butadiene copolymers, ethylene/vinyl acetate copolymers, styrene/isoprene copolymers, styrene/maleic anhydride copolymers, acrylonitrile/(meth)acrylate copolymers, polyvinylpyrrolidone, polyvinylacetate/N-vinyl formamide copolymers, polyvinyl ethers, ethylene/vinylchloride copolymers, rosin acids, rosin esters, terpene phenolics, polyesters, amino resins, epoxy resins, polyacetals, polyamides, polyamines, polyanhydrides, polycarbonates, polyimides, polysaccharides, polysulfides, polyureas, silicones, polyurethanes, phenol formaldehyde, urea formaldehyde and melamine formaldehyde. Most preferred PPEs include polyesters, polyamides, ethylene/acrylic acid copolymers, epoxy resins, polyamines, styrene/butadiene copolymers, acrylonitrile/butadiene/styrene terpolymers, styrene/maleic anhydride copolymers, styrene/isoprene copolymers, polyvinylidene chloride, polysaccharides, polycarbonates, natural rubbers, epoxidized-rubbers and other functionalized rubbers.

Most preferred PPEs include polyacrylonitrile, polyvinyl chloride, polystyrene, poly(meth)acrylates, polyvinyl acetate, polybutadiene, polyacrylonitrile/butadiene/styrene terpolymer, vinyl/acrylic copolymer, styrene/(meth)acrylate copolymers, polychloroprene, polyisoprene, styrene/butadiene copolymers, ethylene/vinyl acetate copolymers, styrene/maleic anhydride copolymers, polyvinylpyrrolidone, polyvinylacetate/N-vinyl formamide copolymers, ethylene/vinylchloride copolymers, rosin acids, rosin esters, terpene phenolics, polyesters, amino resins, epoxy resins, polyamides, polyamines, polyanhydrides, polysaccharides, polyureas, phenol formaldehyde, urea formaldehyde, melamine formaldehyde, natural rubbers, epoxidized-rubbers and other functionalized rubbers.

The choice of the particular ethylenically unsaturated monomer, or monomers, and PPE is dependent on the relative solubility of the polyurethane and the ethylenically unsaturated monomer, the relative solubility of the ethylenically unsaturated monomer and the PPE, and the anticipated end use. For example, one skilled in the art, once having the benefit of this specification, would recognize that monomers and PPEs can be selected to produce particular adhesives with improved properties, for example, flexible laminating adhesives, pressure sensitive or non-pressure sensitive adhesives, contact adhesives, structural adhesives, or conductive adhesives exhibiting, for example, improved adhesion, tensile strength, flexibility, tack, etc. Additionally, monomers and PPEs may be selected to optimize adhesion, strength and clarity where the aqueous polymeric dispersions are utilized as a glass-fiber size composition. Glass fibers are coated with the size compositions and the sized fibers then are used to prepare products such as fiber-reinforced plastic composites, for example. Monomers and PPEs also may be selected to improve water, chemical and heat resistance and tensile strengths when used as a saturant or binder in the manufacture of non-woven articles, such as disposable diapers, tissue, paper products other than tissue, vertical blinds, glass mats and fiberglass insulation. Monomers also may be selected such that the aqueous polymeric dispersion may be used as a high gloss, high hardness, chemical resistant sealant for application to wood substrates, leather substrates and synthetic equivalents thereof, cementitious substrates and other such porous substrates. Monomers and PPEs also may be selected such that the aqueous polymeric dispersions may be used in other aqueous coating compositions where adhesion to synthetic and/or natural non-porous substrates, such as metal, plastics, polyester, polyolefin, and polyamide substrates is required. Monomers and PPEs also may be selected to produce both rigid and flexible foams. The aqueous polymeric dispersions are particularly advantageous for use on hard-to-adhere non-porous substrates. In preparing such aqueous compositions as those discussed above, the aqueous polymeric dispersion may be used neat or may be formulated with other ingredients to prepare formulated aqueous compositions.

In one case, the urethane polymerization may be conducted in the ethylenically unsaturated monomer with or without typical urethane reaction catalysts known in the art. Suitable catalysts include dibutyl tin dilaurate; the stannous salts of carboxylic acids having from 2 to 18 carbon atoms, such as, stannous laurate, stannous stearate, stannous acetate, stannous butyrate, stannous octoate and the like, and mixtures of those. Other suitable catalysts include dibutyl tin dimaleate, tributyl tin oxide, dibutyl tin sulfide, iron acetyl acetonate, cobalt benzoate, tetra (2-ethyl hexyl) titanate, tetra butyl titanate, and the like. Many other compounds accelerate the reaction of a hydroxyl or other groups with an isocyanate in preference to certain other reactions of the isocyanate group, and any of these compounds may be used. Those skilled in the art will choose a specific catalyst to confer desired characteristics to individual urethane reactions. The preceding specific compounds are the preferred compounds and are given for the purpose of illustration and not limitation. In addition, any suitable tertiary amine may be used alone or with the metallic catalyst, for example, triethylene diamine, N-ethyl morpholine, N-methyl morpholine, or 4-dimethyl amino ethyl piperazine.

With respect to the proportion of reactants, the reactants should be selected so that the molecular ratio of isocyanate groups to active hydrogen atoms (including those from the hydrophilic compound and any chain extending agent) is between about 0.7:1 and 2.1:1, and preferably between about 0.9:1 and 1.8:1. The hydrophilic functionality will be present in an amount from about 2% to about 50%, by weight of total polymer solids. Depending upon the desired end use, the particular polyurethane and its molecular weight, the amount of polyurethane employed will vary from about 5 to 75 percent by weight of the PUD, preferably from 15 to 40 percent by weight.

The polymerization of the polyurethane typically is carried out at temperatures in the range of 25°–120° C. for about 1–10 hours to produce a fully reacted polyurethane dissolved in the ethylenically unsaturated monomer. A selected PPE then is dissolved in an ethylenically unsaturated monomer, which may be but need not be the same ethylenically unsaturated monomer used during preparation of the PUD. The unsaturated monomer which contains the dissolved PPE then is added to the PUD and the ethylenically unsaturated monomer is polymerized using conventional batch or slow-add free-radical polymerization procedures.

The polymerization of the ethylenically unsaturated monomer is conducted in the absence of inert organic solvents which conventionally are used in polymerizing ethylenically unsaturated monomers. By "inert", it is meant that the organic solvent does not react with and is not incorporated with either the water-dispersible polyurethane, the ethylenically unsaturated monomer or the PPE. Exemplary inert organic solvents include ketones such as methyl ethyl ketone, hydrocarbon solvents, aromatic solvents such as toluene, ethyl acetate, n-methyl pyrrolidone, and the like. Aqueous dispersions which are prepared using such inert organic solvents will contain volatile organic compounds unless such solvents are stripped from the dispersions prior to use. The inert organic solvents specifically do not include the ethylenically unsaturated monomers which act as a solvent for the PPE.

Suitable polymerization initiators are the water-soluble free-radical-formers generally used in emulsion polymerization, such as, hydrogen peroxide, sodium persulfate, potassium persulfate and ammonium persulfate, and tert-butyl hydroperoxide, in amounts from 0.01% to 3% by weight, preferably 0.01% to 1% by weight, based on the total dispersion solids. These initiators can be used alone or together with reducing agents, such as, sodium formaldehyde-sulfoxylate, ferrous salts, sodium dithionite, sodium hydrogen sulfite, sodium sulfite, sodium thiosulfate, ascorbic acid and isoascorbic acid, to perform as redox catalysts, which will be present in amounts from 0.01% to 3% by weight, preferably 0.01% to 1% by weight, based on the total dispersion solids. The free-radical-formers can be charged to the polymerization in the aqueous solution or can be added during the polymerization in doses or slow-added.

The polymerization is carried out at a pH of between 2 and 10, preferably between 4 and 8. In order to maintain the pH range, it may be useful to work in the presence of customary buffer systems, for example, alkali metal acetates, alkali metal carbonates, or alkali metal phosphates. Polymerization regulators like mercaptans, aldehydes, chloroform, ethylene chloride and trichloroethylene, may also be added in some cases.

The polymerization reaction is generally continued until the residual-free monomer content is below 1% by weight of dispersion solids. The completed reaction product is then allowed to cool to room temperature while sealed from the atmosphere.

In another case, the PPE may be dissolved in the ethylenically unsaturated monomer. The resultant solution is contacted with an aqueous dispersion of a polyurethane, under conditions effective to polymerize the ethylenically unsaturated monomer. The polyurethane may or may not contain ethylenically unsaturated monomer prior to being contacted with the PPE/monomer solution.

In either case discussed above, the resultant material is an aqueous dispersion of particles containing a polyurethane, a polymer comprising the polymerized residue ;of the ethylenically unsaturated monomer (or monomers, if more than one was used) and one or more PPEs. Generally, the final aqueous dispersion will contain from about 20 to about 65 weight percent solids, and 5 preferably about 45 to 55 weight percent solids; particle sizes of 0.03 to 2 microns, preferably 0.04 to 1.0 microns; and more preferably from 0.04 to 0.5 micron; and a solution viscosity of 10 to 5000 mPas (cps), typically 10 to 500 mPas. The dispersions contain less than 2 weight percent of grit (200 mesh screen), preferably less than 1 weight percent, and even more preferably less than 0 1 weight percent. The aqueous dispersion contains from about 5 to about 75 weight percent of the water-dispersible polyurethane, from about 5 to about 75 weight percent of the polymer prepared from the ethylenically unsaturated monomer and from about 0.5 to about 60 weight percent of the PPE, all weights being based on the total weight of solids of the water-dispersible polyurethane, the polymer of the ethylenically unsaturated monomer and the PPE. Preferably, the aqueous dispersion will comprise from about 2 to about 50 weight percent, and more preferably from about 5 to about 30 weight percent of the PPE, based on the total weight of solids of the water-dispersible polyurethane, the polymer of the ethylenically unsaturated monomer and the PPE.

Laminates of the present invention may use as laminae a wide variety of flexible materials. Thus suitable laminae include films of polyethylene and polypropylene, generally corona-treated for adhesion promotion; also, polyester such as polyethylene terephthalate, cellophane and polyamide which may or may not be coated with polyvinylidene dichloride (PVDC) for improved barrier properties. Preferably, dissimilar laminae are used where films, for example, of corona treated polypropylene or polyethylene are bonded to polyester, polyamide-coated or PVDC-coated cellophane or PVDC-coated polyester, or paper. Other laminates include metallic foils such as aluminum foil and metalized films, film-to-fabric, film-to-solids such as plastics or metals, and fabric-to-solids.

Other uses to which the present invention is applicable include, without limitation, roof mastics, flocking adhesives, fabric book coatings, inks, pigment printing, paints and foams. Of course, the dispersions of the present invention may be formulated with auxiliary agents such as crosslinkers, rheology modifiers, coalescent agents, pigments, plasticizers and other additives which are used conventionally depending on the particular end-use application. One skilled in the art, once having the benefit of this disclosure, will be able to ascertain readily which auxiliary agents are appropriate for the selected application.

The following examples set forth below are working examples which serve to illustrate the present invention and polymerization methods used for preparing polymeric hybrids. All parts, percentages and proportions referred to herein and in the claims are by weight unless otherwise indicated.

EXAMPLES 1–4

These examples illustrate the process of preparing a Polyurethane/Acrylic/PPE (PU/A/PPE) aqueous dispersion by employing a polyurethane prepolymer (PUP). The polymeric dispersion was prepared according to the formula and procedure given below. The PUP was made from isophorone diisocyanate (IPDI), dimethylolpropionic acid (DMPA) and polyester diol by employing a batch step addition polymerization of a 1:1 molar ratio of diol and diisocyanate monomers in acrylic monomer as diluent. The reaction was catalyzed by using dibutyl tin dilaurate (DBTDL) and chain stopped at a desired molecular weight with ethanol.

|     | Ingredients | Weight in grams |
| --- | --- | --- |
| (A) | PUP (60%) | 180.0 |
|     | Vitel 5833 | 25.0 |
|     | 2-Ethylhexyl Acrylate (2-EHA) | 50.0 |
| (B) | Water | 235.0 |
|     | Ammoniacal Water (30%) | 4.0 |
| C)  | Water | 150.0 |
|     | Sodium Persulfate (SPS) | 0.5 |
|     | Ammoniacal Water (30%) | 0.1 |

The reaction was carried out in a 2-liter glass reactor equipped with a reflux condenser, addition funnels and stirrer. The PUP, 2-EHA and a solid polyester resin Vitel 5833 (A) were added to the reactor and the contents were heated to 80° C. The reaction mixture was held for 1 hour at 80° C. The PU/Acrylic monomer/Polyester solution was dispersed by adding ammoniacal water (B) to the reactor at 80° C. with agitation at 250 rpm. The dispersion was complete when the contents temperature was restabilized at 80° C. The pH of the dispersion was adjusted to between 7 and 8 by the addition of 30% aqueous ammonium hydroxide solution. The initiator solution (C) was then charged to the reactor, and the reaction mixture was batch polymerized to produce a polymeric system. After initiation, the contents temperature was allowed to increase to 90 to 95° C. When exotherm ceased, the reaction temperature was controlled at 80° C. Agitation was held at 200 rpm during the polymerization process. In thirty minutes, after monomer conversion was complete, the mixture was cooled and discharged.

The physical properties of the polymeric dispersion are described in Table 1 as an aqueous dispersion product (ADP). The procedure was then repeated using different PPEs and the polymeric dispersions thus produced were designated ADP 2 through 4, and are reported in Table 1.

TABLE 1

| ADP | PPE* | % Solids | pH | % Grit (200 mesh) | Particle Size (nm) |
| --- | --- | --- | --- | --- | --- |
| 1 | Vitel 5833 | 42.6 | 6.4 | 0.03 | 148 |
| 2 | Epon 834 | 38.1 | 6.8 | 0.01 | 269 |
| 3 | DPS 155 | 37.4 | 6.8 | 0.02 | 206 |
| 4 | P 2000 | 40.8 | 6.5 | 0.01 | 111 |

*Vitel 5833 - Polyester Resin, Shell Chemical Co.
Epon 834 - Epoxy Resin, Shell Chemical Co.
DPS 155 - Epoxy Resin, Shell Chemical Co.
P 2000 - Polyamine Resin, Air Products and Chemicals, Inc.

EXAMPLES 5–11

These examples illustrate the process of preparing PU/A/PPE dispersions by employing an aqueous polyurethane dispersion (PUD). A PUP was prepared as described in Example 1 but at 1.3:1.0 molar ratio of diisocyanate to diol monomers. The PUP was preneutralized with triethylamine (TEA) and chain extended to a desired molecular weight with 2% aqueous solution of isophorone diamine (IPDA) at 65° C. during a 1 hour reaction time with agitation at 250 rpm. The polymeric dispersion was made according to the formula and procedure given below.

|     | Ingredients | Weight in grams |
| --- | --- | --- |
| (A) | 2-Hydroxyethyl Acrylate (2-HEA) | 8.0 |
|     | Butyl Acrylate (BA) | 24.0 |
|     | Methyl Methacrylate (MMA) | 24.0 |
|     | Nucrel 599 | 20.0 |
| (B) | PUD (33%) | 300.0 |
|     | Water | 30.0 |
| (C) | Water | 15.0 |
|     | SPS | 0.2 |
| (D) | BA | 30.0 |
|     | MMA | 30.0 |
| (E) | Water | 30.0 |
|     | SPS | 0.3 |
| (F) | Water | 15.0 |
|     | SPS | 0.1 |
| (G) | Water | 15.0 |
|     | Sodium Metabisulfite (SMBS) | 0.1 |

The reaction was carried out in a 2-liter glass reactor equipped with a reflux condenser, addition funnels and stirrer. Charge (A) was added to the reactor with agitation at 100 rpm, and the reactor was heated to 80° C. The reaction mixture was held for 0.5 hour at 80° C., then charge (B) was added with agitation increased to 250 rpm. The contents temperature was restabilized at 80° C. The initiator solution (C) was then charged to the reactor. After initiation, the contents temperature was allowed to increase to 90–95° C. When exotherm ceased, the temperature was then controlled at 80° C. The reaction mixture was batch polymerized to convert the acrylic monomer. Following conversion, the remainder of acrylic monomer, charge (D) and initiator solution (E) were uniformly metered to the reactor over a period of 1.5 hours. The reaction temperature was controlled at 80° C. After the charges (D) and (E) were slow-added to the reactor the contents were held for 30 minutes at 80° C., then cooled down to 65° C. Charges (F) and (G) were slow-added for 10 minutes at 65° C. The mixture was cooled and discharged. The polymerization was carried out with agitation at 200 rpm.

The physical properties of the polymeric dispersion are described in Table 2 as an aqueous dispersion product (ADP). The procedure was then repeated using different PPEs and the polymeric dispersions produced were designated ADP 5 through 11 and are reported in Table 2.

TABLE 2

| ADP | PPE* | % Solids | pH | % Grit (200 mesh) | Particle Size (nm) |
|---|---|---|---|---|---|
| 5 | Nucrel 599 | 42.5 | 6.6 | 0.02 | 128 |
| 6 | AC 5120 | 42.1 | 6.6 | 0.02 | 130 |
| 7 | AC 440 | 42.1 | 6.6 | 0.01 | 108 |
| 8 | Vamac G | 43.1 | 6.6 | 0.03 | 105 |
| 9 | F 2311 | 42.4 | 6.7 | 0.01 | 131 |
| 10 | Vitel 5833 | 37.4 | 6.8 | 0.01 | 143 |
| 11 | F 2311 Vitel 5833 | 41.5 | 6.9 | 0.01 | 97 |

*Nucrel 599 - Ethylene/Methacrylic copolymer, Du Pont Polymers
AC 5120 - Ethylene/Acrylic Acid Copolymer, Allied Signal Inc;
AC 440 - Ethylene/Vinyl Acetate Copolymer, Allied Signal Inc.
Vamac G - Ethylene/Acrylic Elastomer, Du Pont Polymers
F2311 - Polyester Resin, Ruco Polymer Corporation

EXAMPLES 12–14

These examples illustrate the process of preparing polymeric dispersions containing a combination of PPEs. A PUD was prepared as described in Example 5. A PU/A/PPE dispersion was made according to the formula and procedure given below.

| | Ingredients | Weight in grams |
|---|---|---|
| (A) | 2-HEA | 10.0 |
| | BA | 25.0 |
| | MMA | 25.0 |
| | F2311 | 25.0 |
| | Epon 828 | 25.0 |
| (B) | PUD (32%) | 320.0 |
| | Water | 50.0 |
| (C) | Water | 20.0 |
| | FeSO$_4$ 7H$_2$O (1% solution in water) | 1.4 |
| | SMBS | 0.2 |
| (D) | BA | 35.0 |
| | MMA | 35.0 |
| (E) | Water | 50.0 |
| | SPS | 0.7 |
| (F) | Water | 50.0 |
| | SMBS | 0.7 |
| (G) | Water | 10.0 |
| | SPS | 0.1 |
| (H) | Water | 10.0 |
| | SMBS | 0.1 |

The reaction was carried out in 2-liter glass reactor equipped with a reflux condenser, addition funnels and stirrer. Charge (A) was added to the reactor with agitation at 100 rpm, and the reactor was heated to 80° C. The reaction mixture was held for 0.5 hour at 80° C., then charge (B) was added with agitation increased to 250 rpm. The contents temperature was restabilized at 80° C. The contents were cooled down to 65° C. and catalyst solution (C) was then charged to the reactor. The charges (E) and (F) were uniformly slow-added to the reactor over a period of 3.0 hours. After initiation, the contents temperature was controlled at 60–65° C. The reaction mixture was batch polymerized to convert the acrylic monomer. Following conversion, the remainder of acrylic monomer, charge (D) was uniformly metered to the reactor over a period of 2.5 hours. The reaction temperature was controlled at 60–65° C. After the charges (D), (E) and (F) were slow-added to the reactor, the contents were held for 30 minutes at 65° C. Charges (G) and (H) were slow-added for 10 minutes at 65° C. The mixture was cooled and discharged. The polymerization was carried out with agitation at 200 rpm.

The physical properties of the polymeric dispersion are described in Table 3 as an aqueous dispersion product (ADP). The procedure was then repeated using different PPEs and the polymeric systems produced are designated ADP 12 through 14 and are reported in Table 3.

TABLE 3

| ADP | PPE* | Solids | pH | % Grit (200 mesh) | Particle Size (nm) |
|---|---|---|---|---|---|
| 12 | F2311 Epon 828 | 40.8 | 7.6 | 0.01 | 120 |
| 13 | Epon 828 AC 5180 | 41.1 | 7.2 | 0.01 | 124 |
| 14 | F2311 AC 5180 | 40.9 | 6.6 | 0.02 | 165 |

*Epon 828 - Epoxy Resin, Shell Chemical Co.
AC 5180 - Ethylene/Acrylic Acid Copolymer, Allied Signal Inc.

EXAMPLES 15–17

These examples illustrate the process of preparing PU/A/PPE dispersions by employing a PU which has been synthesized in the absence of acrylic monomer. The PU was prepared from isophorone diisocyanate, polypropylene glycol 2025 and dimethylolpropionic acid. The PUP was dispersed and chain extended with water to give a 33% solids PUD. Polymeric dispersions were prepared from the PUDs according to the following formulae and procedures. Physical properties of the PU/A/PPE dispersions are set forth in Table 4.

Example 15

| | Ingredients | Weight in grams |
|---|---|---|
| (A) | 2-HEA | 5.0 |
| | BA | 75.0 |
| | MMA | 75.0 |
| | F2311 | 11.0 |
| (B) | PUD (32%) | 314.0 |
| | Water | 545.0 |
| (C) | Water | 5.0 |
| | SPS | 0.2 |
| (D) | BA | 30.0 |
| | MMA | 30.0 |
| (E) | Water | 30.0 |
| | SPS | 0.3 |
| (F) | Water | 5.0 |
| | SPS | 0.1 |
| (G) | Water | 5.0 |
| | Sodium Metabisulfite | 0.1 |

Example 16

| | Ingredients | Weight in grams |
|---|---|---|
| (A) | BA | 75.0 |
| | MMA | 75.0 |
| (B) | PUD (33%) | 314.0 |
| | Water | 545.0 |
| (C) | Water | 5.0 |
| | SPS | 0.2 |
| (D) | BA | 30.0 |
| | MMA | 30.0 |
| | 2-HEA | 5.0 |
| | F2311 | 11.0 |
| (E) | Water | 30.0 |
| | SPS | 0.3 |
| (F) | Water | 5.0 |

-continued

| | Ingredients | Weight in grams |
|---|---|---|
| | SPS | 0.1 |
| (G) | Water | 5.0 |
| | Sodium Metabisulfite | 0.1 |

Example 17

| | Ingredients | Weight in grams |
|---|---|---|
| (A) | 2-HEA | 2.5 |
| | BA | 75.0 |
| | MMA | 75.0 |
| | F2311 | 5.0 |
| (B) | PUD (33%) | 314.0 |
| | Water | 545.0 |
| (C) | Water | 5.0 |
| | SPS | 0.2 |
| (D) | BA | 30.0 |
| | MMA | 30.0 |
| | 2-HEA | 2.5 |
| | F2311 | 5.0 |
| (E) | Water | 30.0 |
| | SPS | 0.3 |
| | Water | 5.0 |
| | SPS | 0.1 |
| (G) | Water | 5.0 |
| | Sodium Metabisulfite | 0.1 |

Procedure:

The reaction was carried out in a 2 L glass reactor equipped with a reflux condenser, metering pumps and stirrer. Charge (A) was added to the reactor with agitation at 100 rpm, and the reactor was heated to 80° C. The mixture was held for 0.5 hour at 80° C., then charge (B) was added with agitation increased to 250 rpm. The reactor contents were allowed to mix with agitation of 120 rpm for 1 hour at 80° C. The initiator solution (C) was then charged to the reactor. When the reaction temperature was stabilized at 80° C., solutions (D) and (E) were uniformly metered to the reactor over a period of 1.5 hours, with agitation at 200 rpm. The reaction temperature was controlled at 80° C. The reactor contents were held for a further 30 minutes at 80° C., then cooled to 65° C. Charges (F) and (G) were added at 65° C. and held for 20 minutes at 65° C. The mixture was cooled and discharged.

TABLE 4

| ADP | PPE | Solids | pH | % Grit (200 mesh) | Particle Size (nm) |
|---|---|---|---|---|---|
| 15 | F2311 | 28.4 | 7.1 | <0.1% | 84 |
| 16 | F2311 | 28.8 | 7.3 | <0.1% | 88 |
| 17 | F2311 | 29.7 | 6.2 | <0.1% | 89 |

EXAMPLES 18–21

These examples illustrate the process of preparing PU/A/PPE blends by employing a PUD. The PUD was prepared as described in Example 5. Polymer blends were made according to the formula and procedure given below.

| | Ingredients | Weight in grams |
|---|---|---|
| (A) | 2-Hydroxyethyl Acrylate (2-HEA) | 10.0 |
| | Butyl Acrylate (BA) | 25.0 |
| | Methyl Methacrylate (MMA) | 25.0 |
| (B) | PUD (33%) | 320.0 |
| | Water | 50.0 |
| (C) | Water | 20.0 |
| | SPS | 0.2 |
| (D) | BA | 35.0 |
| | MMA | 35.0 |
| (E) | Water | 50.0 |
| | SPS | 0.5 |
| (F) | Water | 10.0 |
| | SPS | 0.1 |
| (G) | Water | 10.0 |
| | Sodium Metabisulfite (SMBS) | 0.1 |
| (H) | Vitel 5833 | 25.0 |

The reaction was carried out in a 2-liter glass reactor equipped with a reflux condenser, addition funnels and stirrer. Charge (A) was added to the reactor with agitation at 100 rpm, and the reactor was heated to 80° C. The reaction mixture was held for 0.5 hour at 80° C., then charge (B) was added with agitation increased to 250 rpm. The contents temperature was restabilized at 80° C. The initiator solution (C) was then charged to the reactor. After initiation, the contents temperature was allowed to increase to 90–95° C. When exotherm ceased, the temperature was then controlled at 80° C. The reaction mixture was batch polymerized to convert the acrylic monomer. Following conversion, the remainder of acrylic monomer, charge (D) and initiator solution (E) were uniformly metered to the reactor over a period of 1.5 hours. The reaction temperature was controlled at 80° C. After the charges (D) and (E) were slow-added to the reactor the contents were held for 30 minutes at 80° C., then cooled down to 65° C. Charges (F) and (G) were slow-added for 10 minutes at 65° C. The polymerization was carried out with agitation at 200 rpm. The reaction mixture was heated to 85° C., and charge (H) was added to the reactor. The contents temperature was stabilized at 80° C. The mixing was performed with agitation at 250 rpm over a period of 1.0 hour. The mixture was slowly cooled down and discharged.

The physical properties of the polymer blends are described in Table 5 as an aqueous blend product (ABP). The procedure was then repeated using different PPEs and the polymer blends produced were designated ABP 18 through 21 and are reported in Table 5.

TABLE 5

| ABP | PPE | Solids | pH | Comments |
|---|---|---|---|---|
| 18 | Vitel 5833 | 40.8 | 6.8 | Phase separation at RT |
| 19 | F2311 | 41.5 | 7.1 | Phase separation at RT |
| 20 | AC 5180 | 41.5 | 6.9 | Phase separation at RT |
| 21 | Epon 828 | 40.8 | 7.2 | Phase separation at RT |

TESTING

Adhesive properties of a laminated film
  Substrates are:
    0.00048 in polyester film (MYLAR 48LBT) from DuPont (Wilmington, Del.)
    0.001 in Aluminum Foil from Reynolds Metals (Richmond, Va.)
    0.0024 in linear low density polyethylene from Ethyl Visqueen Film Products (Richmond, Va.)

Equipment:
Wirewound coating rod #4 or #5 Consler Scientific Design, Inc. (Oldsmar, Fla.)
Instron Universal Testing Instrument Model 4201 (Canton, Mass.)
Laminator Talboys Engineering Corporation (Emerson, N.J.)

Procedure:

Several of the adhesives were formulated with a water dispersible isocyanate, Basonat 3425 from BASF Corp., see Table 6 to 7.

The adhesive was coated on the polyester film (Table 5 and 6) or the aluminum foil (Table 7 and 8) using the wirewound coating rod and it was dried using a heat gun. The dry coating weight was about 1.7 lb/3000 ft$^2$. The coated film then laminated to the polyethylene at 3 ft/min. The pressure and temperature of the laminator was 20 psi and 160° F. respectively. The lamination was stored at constant humidity (50% RH) and temperature (72° F.) room for 7 days and 7 days plus 24 hours in a water bath. The films were cut into 1 inch wide strips. These strips were pulled apart at 72 F in a T-peel configuration at a rate of 12 inches/min. The peeling force is stated in grams for the 1 inch wide strips.

Alcohol Resistance Test Procedure:

A lamination is prepared as was described earlier using aluminum foil and the polyethylene film. After seven days a 4'×5.5' pouch was prepared and inside the pouch was placed a paper towel wetted with 30% ethanol/water solution. After seven days the peel force was measured as described earlier.

TABLE 6

| Example | 1 | 1 | 10 |
|---|---|---|---|
| Primary | PET | PET | PET |
| Secondary | LLDPE | LLDPE | LLDPE |
| BASONAT 3425, pph | 0 | 3 | 5 |
| BOND PERFORMANCE G/IN | | | |
| 1 WEEK | 380 | 346 | F.T. |
| 1 WK + 24 HRS WATER SOAK | 40 | 167 | F.T. |

TABLE 7

| SAMPLE ID | 4 | 4 | 2 | 3 |
|---|---|---|---|---|
| Primary | PET | PET | PET | PET |
| Secondary | LLDPE | LLDPE | LLDPE | LLDPE |
| BASONAT 3425, pph | 0 | 3 | 0 | 0 |
| BOND PERFORMANCE G/IN | | | | |
| 1 WEEK | 428 | 540 | 345 | 480 |
| 1 WK + 24 HRS WATER SOAK | 108 | 150 | 227 | 205 |

TABLE 8

| SAMPLE ID | 5 | 6 | 7 | 8 | 9 | 11 |
|---|---|---|---|---|---|---|
| Primary | Al | Al | Al | Al | Al | Al |
| Secondary | LLDPE | LLDPE | LLDPE | LLDPE | LLDPE | LLDPE |
| BASONAT 3425, pph | 5 | 5 | 5 | 5 | 5 | 5 |
| BOND PERFORMANCE G/IN | | | | | | |
| 1 WEEK | 178 | 201 | 296 | 349 | 582 | 434 |
| 1 WK + 24 HRS WATER SOAK | 133 | 195 | 341 | 260 | 393 | 346 |
| Alcohol resistance | NT | NT | NT | NT | 275 | NT |

TABLE 9

| Sample ID | 12 | 13 | 14 |
|---|---|---|---|
| Primary | Al | Al | Al |
| Secondary | LLDPE | LLDPE | LLDPE |
| BASONAT 3425, pph | 5 | 5 | 5 |
| BOND PERFORMANCE G/IN | | | |
| 1 WEEK | 239 | 404 | 125 |
| 1 WK + 24 HRS WATER SOAK | 144 | 270 | 71 |

TABLE 10

| SAMPLE IDx | 15 | 16 | 17 |
|---|---|---|---|
| | unstable | unstable | unstable |

EXAMPLES 19 and 20

Aqueous polyurethane dispersions (PUD) of the present invention and comparative aqueous polyurethane dispersions of the types disclosed in U.S. Pat. Nos. 4,644,030, 4,927,876 and 5,137,961 were prepared, evaluated and compared with respect to bond strength and water resistance. Example 19 is a comparative PUD, wherein the polyurethane dispersion and ethylenically unsaturated monomer were reacted in the absence of a polymeric performance enhancer. Example 20 was prepared in the same manner as Example 19, except that the polyurethane dispersion and the ethylenically unsaturated monomer were reacted in the presence of a polyester polymeric performance enhancer. The results of the comparative evaluation are set forth in Table 11

TABLE 11

Enhanced Adhesive Performance with polymeric performance enhancer

| Example | 19 | 20 |
|---|---|---|
| Polyurethane backbone | Polyester | Polyester |
| Polymeric performance enhancer | No | Yes |
| Adhesive Performance | | |
| Initial bond (g/in) | 344 | 564 |
| 24 hrs | 333 | 594 |
| 1 week | 311 | 583 |
| 1 week + 24 hrs water soak | 121 | 394 |

As indicated in Table 11, Example 20 has superior adhesion performance (i.e., bond strength) than does Example 19 when both are tested under the same conditions in an aluminum foil to linear low density polyethylene laminate.

Additionally, Example 19 exhibits about a 65% loss in initial bond strength after being exposed to a 24 hour water soak after 1 week of aging, while Example 20 exhibits a loss of initial bond strength of only about 30% under the same conditions. Therefore, the inclusion of a polymeric performance enhancer significantly improves not only the initial bond strength of the adhesive, but also significantly improves resistance to water.

EXAMPLES 21–27

A series of polyurethane dispersions were prepared and evaluated for adhesion and water resistance as above. The compositions and results of the evaluations are set forth in Table 12.

TABLE 12

| Example | 21 | | 22 | | 23 | 24 | 25 | 26 | 27 |
|---|---|---|---|---|---|---|---|---|---|
| PU Backbone | PED | | PED | | PED | PED | PED | PED | PED |
| Monomers | 92 BA | | 86 BA | | 78 BA | 77 BA | 55 BA | 48 2-EHA | 53 BA |
|  | 5 MMA | | 5 MMA | | 22 MMA | 18 MMA | 37 MMA | 22 EA | 40 MMA |
|  | 3 MAA | | 6 GMA | |  | 5 GMA | 8 HEA | 10 GMA | 7 HEA |
|  |  | | 3 MAA | |  |  |  | 10 St |  |
| Adhesive Performance |  | |  | |  |  |  |  |  |
| Initial (g/in) | 480 | 285 | 462 | 274 | 255 | 251 | 344 | 356 | 564 |
| 24 hours | 505 | 331 | 408 | 312 | 284 | 291 | 333 | FT | 594 |
| 1 week | 525 | 391 | 313 | 346 | 316 | 353 | 311 | FT | 583 |
| 1 week + 24 hours (water) | 24 | 45 | 60 | 81 | 59 | 69 | 121 | 203 | 394 |
| 1 week + 30 min (water boil) | 34 | 82 | 64 | 42 | NT | NT | NT | 452 | NT |
| Substrate | PET | PET | PET | PET | PET | PET | LLDPE | PET | LLDPE |
|  | LLDPE | Al | LLDPE | Al | Al | Al | Al | LLDPE | Al |

NT = Not tested
FT = Film tears
Al = Aluminum foil
PET = Polyester film
LLDPE = Polyethylene film
PED = Polyester diol
EA = Ethyl acrytate
BA = Butyl acrylate
MMA = Methyl methacrylate
GMA = Glycidyl methacrylate
HEA = Hydroxyethyl acrylate
2-EHA = 2-ethylhexyl acrylate
MAA = methacrylic acid As the data in Table 12 indicate, Examples 21 to 25, which do not contain a polymeric performance enhancer, exhibit poor resistance to water, as evidenced by the significant loss in bond strength after being soaked in water for 24 hours after one week aging. Utilizing functional monomers such as GMA, HEA, MAA, etc., did not improve the resistance to water. Only when the PPE is present do the resultant dispersion and those adhesives which utilize the dispersion exhibit superior overall performance.

EXAMPLE 28

Preparation of an aqueous dispersion of PU/A/PPE for Nonwovens and Glass fiber mats:

The polyurethane prepolymer is first prepared by reacting 25 gm of DMPA, 60 gm of PPG-400 (polypropylene gylcol, molecular weight of 400) and 104.9 gm of hydrogenated methylene bisphenylene diisocyantate at 80° C., in the presence of 4 gm butyl acrylate (BA) and 16 gm of methyl methacrylate (MMA), until all the hydroxy groups have reacted. The reactants are then cooled to 45° C. and the neutralizing agent, 20.8 gm of triethyl amine is then added. This prepolymer is then dispersed in sufficient amount of water to obtain a 22.2% solids dispersion. An additional 2.8 gm of triethyl amine is added to ensure complete neutralization of the carboxyl groups.

A solution of 7.5 gm of BA and 30 gm of MMA is prepared and added to 414 gm of the above PU dispersion at 80° C. An initiator solution containing 0.2 gm of sodium persulfate and 10 gm of water is then added to the reaction mixture.

After the initial exotherm is over, a monomer mixture containing 16.7 gm of BA, 68.5 gm of MMA,7.4 gm of GMA and 12.3 gm of Epon 828 is then metered in over 2 hours, while maintaining a temperature of 80° C. Simultaneously, an initiator solution containing 0.6 gm of sodium persulfate in 55 gm of water is also metered in over 2.5 hours, along with a reducing agent solution consisting of 0.6 gm of sodium metabisulfite in 55 gm of water. The final dispersion has a particle size of 140 nm, viscosity of <50 cps, pH of 8.2, 0.016% grit, and a solids of 30.9%.

EXAMPLE 29

Comparative Example: Preparation of an aqueous dispersion of PU and acrylic only.

The polyurethane prepolymer is first prepared by reacting 10 gm of DMPA, 60 gm of PPG-400, 3.1 gm of ethylene glycol and 91 gm of isophorone diisocyantate at 85° C. and 0.2 gm of dibutyltin dilaurate. This prepolymer is prepared in the absence of any monomers, until all the hydroxy groups have reacted. The reactants are then cooled to 60° C. and 7.59 gm of triethyl amine is then added. This prepolymer is then dispersed in an amount of water sufficient to obtain a 31.89% solids dispersion at a pH of 6.8.

To 225 gm of the above PU dispersion, 10 gm of butyl acrylate, 0.2 gm of sodium persulfate and 164 gm of water are added. The pH of this initial charge is raised from 7.26 to 7.76 with 10% ammonia solution and the temperature is raised to 65° C. After the initial exotherm is over, a monomer mixture containing 32.4 gm of BA and 179.5 gm of MMA is then metered in over 2 hours, while maintaining a temperature of 70° C. Simultaneously, an initiator solution containing 0.36 gm of sodium persulfate and 0.7 gm of 10% ammonia in 30 gm of water is also metered in over 2.5 hours. This is then followed with 5.25 gm of an oxidizing agent solution (containing 0.25 gm of t-butyl hydroperoxide in 5 gm of water) and 5.45 gm of a reducing agent (containing 0.25 gm of ascorbic acid and 0.2 gm of 10% ammonia in 5 gm of water). The final dispersion has a particle size of 164 nm, viscosity of <50 cps, pH of 7.87, 0.004% grit and a solids of 43.8%.

Results:

1. High temperature stiffness:

The high temperature stiffness (modulus) of the above two polymers were measured using a Perkin-Elmer's DMA System 7. A temperature sweep was conducted between −50° C. and 200° C. using a 3-point bending configuration and 1 Hz frequency.

| TEMP | 50° C. | 80° C. | 120° C. | 150° C. | 180° C. |
|---|---|---|---|---|---|
| Example 28 | 5 × 10E9 | 2 × 10E8 | 8 × 10E8 | 8 × 10E8 | 8 × 10E8 |
| Example 27 | 5 × 10E9 | 8 × 10E8 | 9 × 10E7 | <<10E7 | <<10E7 |

The above table indicates that the presence of the PPE provides enhanced stiffness at high temperatures. A typical use for this dispersion is automotive cellulosic filter paper binders that require high temperature stiffness.

2. Chemical Resistance:

After application of Example 28 on automotive cellulosic filter paper, the coated paper was soaked in 70° C. hot oil (Dextron Motor oil) for 24 hr to 72 hrs and the tensile strengths were measured. It was observed that there were no significant differences in the tensile strengths before and after soaking in hot oil. Hence, these systems provide the necessary chemical resistance.

3. Tensile strengths on glass fiber:

G/FB Whatman glass fiber paper stock was saturated with a 5% solids bath containing the aqueous dispersion to which a 5% solution of Basonat (BASF) was also added. The target pick-up was 20%. The samples was cured for 10 min at 300° F.

| | Dry tensile strength (lb) | Wet Tensile strength* (lb) |
|---|---|---|
| Example 28 | 11.4 | 11.0 |
| Example 29 | 7.19 | 5.28 |

*Glass fiber mat soaked in 1% Triton X-100 (Union Carbide) solution for one minute, dried overnight and then tested. The above table indicates that the presence of the PPE provides enhanced strength properties and also good water resistance.

EXAMPLE 30

Preparation of a PU/A/PPE for wood coatings:

The polyurethane prepolymer is first prepared by reacting 12 gm of DMPA, 56.3 gm of PPG-1000, 1.2 gm of ethylene glycol and 78.6 gm of hydrogenated methylene bisphenylene diisocyantate at 85° C., in the presence of 22.5 gm butyl acrylate (BA) and 22.5 gm of methyl methacrylate (MMA) and a catalyst, 0.1 gm dibutyl tin dilaurate, until all the hydroxy groups have reacted. The reactants are then cooled to 60° C. and 9.97 gm of triethyl amine is then added. This prepolymer is then dispersed in sufficient amount of water to obtain a 20.8% solids containing dispersion. An additional 1.36 gm of triethyl amine was added to ensure complete neutralization of the carboxyl groups.

A solution of 3.0 gm of Rucflex F-231 1 in 25 gm of BA and 25 gm of MMA is prepared and is metered in to 100 gm of the above PU dispersion at 65° C., over a period of 30 minutes. An initiator solution containing 0.2 gm of sodium persulfate in 10 gm of water and 0.2 gm of sodium metabisulfite in 10 gm of water are then added to the reaction mixture over 30 minutes. After the initial exotherm is over, the temperature is maintained for 30 min. Another shot of the initiator solution is then added and the reaction mixture is then cooled and discharge. The final dispersion has a viscosity <50 cps, pH of 7.8 and solids of 30.8%.

Testing:

A coating of 2 mil thickness is applied on a wood pan el. The aqueous dispersion formed a clear coating at room temperature. This coating exhibited good resistance to cold and hot water and the chemical resistance was observed to be acceptable for normal wood coatings.

EXAMPLE 31

Preparation of aqueous PU/A/PPE dispersion s for glass sizing:

The polyurethane prepolymer is first prepared by reacting 53.6 gm of DMPA, 95.0 gm of Rucoflex S-1015-120 (polyester diol—a glycol adipate, molecular weight 950), 100 gm of hydroxy-terminated polybutadiene and 166.5 gm of isophorone diisocyantate at 85° C., in the presence of 0.4 gm of dibutyl tin dilaurate, 110.7 gm butyl acrylate (BA) and 27.7 gm of methyl methacrylate (MMA), until all the hydroxy groups have reacted. The reactants are then cooled to 65° C. and the neutralizing agent, 32.3 gm of triethyl amine is then added. This prepolymer is then dispersed in sufficient amount of water to obtain a 33.2% solids dispersion at a pH of 7.0. The reaction mixture is then cooled and discharged.

A solution of 25 gm of BA, 25 gm of MMA and 20 gm of Vitel 3500 (Polyester triol) is prepared and added to 309.1 gm of the above PU dispersion at 80° C. Then 8.0 gm of hydroxy ethyl acrylate is added into the reactor. An initiator solution containing 0.2 gm of sodium persulfate and 15 gm of water is then added to the reaction mixture, followed by another 30 gm of water.

After the initial exotherm is over, a monomer mixture containing 30 gm of BA and 30 gm of MMA is then metered in over 1.5 hours, while maintaining a temperature of 80° C. Simultaneously, an initiator solution containing 0.3 gm of sodium persulfate in 30 gm of water is also metered in over 2.0 hours. A post-addition of a redox solution is also conducted via an initiator solution containing 0.1 gm of sodium persulfate in 15 gm water along with a reducing agent solution consisting of 0.1 gm of sodium metabisulfite in 15 gm of water. The final dispersion has a particle size of 93 nm, viscosity of <50 cps, pH of 6.7, 0.07% grit, and a solids of 42.4%.

EXAMPLE 32

Comparative example: Preparation of an aqueous dispersion of PU and acrylic only.

The polyurethane prepolymer is first prepared by reacting 60.5 gm of DMPA, 756 gm of PPG-2025 and 335.6 gm of isophorone diisocyantate at 85° C. This prepolymer is prepared in the absence of any monomers, until all the hydroxy groups have reacted. The reactants are then cooled to 60° C. and 46.9 gm of triethyl amine is then added. This prepolymer is then dispersed in sufficient amount of water to obtain a 35.5% solids dispersion at a pH of 6.8.

To 366.8 gm of the above PU dispersion, 10 gm of butyl acrylate, 0.2 gm of sodium persulfate and 290 gm of water are added. The temperature is raised to 65° C. After the initial exotherm is over, a monomer mixture containing 32.4 gm of BA, 179.5 gm of MMA and 17.5 gm of glycidyl methacrylate is then metered in over 2 hours, while maintaining a temperature of 70° C. Simultaneously, an initiator solution containing 0.6 gm of sodium persulfate and 1.2 gm of 10% ammonia in 50 gm of water is also metered in over 2.5 hours. This is then followed with 3.6 gm of an oxidizing agent solution (containing 0.6 gm of t-butyl hydroperoxide in 3 gm of water) and 5.4 gm of a reducing agent (containing 0.4 gm of ascorbic acid in 5 gm of water). The final dispersion has a particle size of 152 nm, viscosity of 205 cps, pH of 7.6, 0.04% grit and a solids of 45.1%.

Testing:

A high modulus is required for glass fiber sizing applications.

Example 31 exhibited an elongation of 390%, a peak tensile strength of 31 pounds and initial inflection point occurred at 17 lbs. The comparative Example 32 showed 315% elongation, a peak tensile strength of 28 lbs and the inflection point occurred at 6 lbs. The area underneath the curves gives an indication of the toughness or the modulus of the polymers. From the above data, it is obvious that the toughness of the PU/A/PPE polymer films is relatively higher.

EXAMPLE 33

Preparation of a contact adhesive:

The polyurethane prepolymer is first prepared by reacting 24 gm of DMPA, 170 gm of Rucoflex S107-110 (neopentyl adipate polyol from Ruco Polymer Corp, Hicksville, N.Y.), 89 gm of isophorone diisocyanate and 0.2 gm of dibutyltin dilaurate at 80° C., in the presence of 48 gm butyl acrylate (BA) and 12 gm of methyl methacrylate (MMA), until all the hydroxy groups have reacted. The reactants are then cooled to 45° C. and 18.1 gm of triethyl amine is then added. This prepolymer is then dispersed in sufficient amount of water to obtain a 30.5% solids dispersion. An additional 4.5 gm of triethyl amine is added to ensure complete neutralization of the carboxyl groups.

To 201 gm of the above PU dispersion, 10 gm of BA, 0.2 gm of sodium persulfate and 166 gm of water are added and the temperature is raised to 80° C. After the initial exotherm is over, a monomer mixture containing 169.5 gm of BA, 45 gm of MMA and 10 gm of SP-553 (a terpene-phenolic resin from Schenectady Chemicals Inc., Schenectady, N.Y.) is then metered in over 2 hours, while maintaining a temperature of 80° C. Simultaneously, an initiator solution containing 0.36 gm of sodium persulfate and 0.7 gm of 10% ammonia in 30 gm of water is also metered in over 2.5 hours. This is then followed with 5.25 gm of an oxidizing agent solution (containing 0.25 gm of t-butyl hydroperoxide in 5 gm of water) and 5.45 gm of a reducing agent (containing 0.25 gm of ascorbic acid and 0.2 gm of 10% ammonia in 5 gm of water). The final dispersion has a particle size of 192 nm, viscosity of 140 cps, pH of 7.25, 0.10% grit, and a solids of 48.4%.

EXAMPLE 34

Preparation of foams from PU/A/PPE:

The aqueous dispersion prepared from Example 28 was used to prepare a foam. The foamed polymer is obtained by mixing 8 g urea into 20 g of a PU/A/PPE aqueous dispersion (28% solids). A film of this mixture is dried and heated to 240° C. for 10 minutes to decompose the urea. The original film thickness was 2 mm, while the foamed thickness was 8 mm.

We claim:

1. A process for preparing an aqueous polymeric dispersion, the process comprising:

providing an aqueous dispersion of a polyurethane which is water-dispersible in the absence of surfactants, providing an ethylenically unsaturated monomer which is capable of free-radical polymerization, providing a polymeric performance enhancer which is not dispersible itself in water without the aid or use of a surfactant and which is selected from the group consisting of a) naturally occurring polymers selected from the group consisting of rosin acids, rosin esters, terpene phenolics, natural rubbers, epoxidized-rubbers and other functionalized rubbers, and b) condensation polymers selected from the group consisting of polyesters, amino resins, epoxy resins, furan polymers, polyacetals, poly(alkylene sulfide)s, polyamides, polyamines, polyaminotriazoles, polyanhydrides, polycarbonates, polyhydrazines, polyimides, polyquinoxalines, polysaccharides, polysulfides, polyureas, proteins, silicones, polyurethanes, phenol formaldehyde, urea formaldehyde and melamine formaldehyde, contacting said aqueous polyurethane dispersion, said ethylenically unsaturated monomer and said polymeric performance enhancer in the presence of water and under conditions effective to polymerize said ethylenically unsaturated monomer, wherein said contacting step is conducted in the absence of a surfactant and in the absence of an organic solvent, thereby forming the aqueous polymeric dispersion comprising at least three discrete polymeric components.

2. The process of claim 1 wherein the polymeric performance enhancer is selected from the group consisting of rosin acids, rosin esters, terpene phenolics, polyesters, amino resins, epoxy resins, polyamides, polyamines, polyanhydrides, polysaccharides, polyureas, phenol formaldehyde, urea formaldehyde, melamine formaldehyde, natural rubbers, epoxidized-rubbers and other functionalized rubbers.

3. An aqueous polymeric dispersion, comprising:

water, a polyurethane which is water-dispersible in the absence of surfactants, a polymer prepared from an ethylenically unsaturated monomer which is capable of free-radical polymerization; and a polymeric performance enhancer which is not dispersible itself in water without the aid or use of a surfactant and which is selected from the group consisting of a) naturally occurring polymers selected from the group consisting of rosin acids, rosin esters, terpene phenolics, natural rubbers, epoxidized-rubbers and other functionalized rubbers, or b) condensation polymers selected from the group consisting of polyesters, amino resins, epoxy resins, furan polymers, polyacetals, poly(alkylene sulfide)s, polyamides, polyamines, polyaminotriazoles, polyanhydrides, polycarbonates, polyhydrazines, polyimides, polyquinoxalines, polysaccharides, polysulfides, polyureas, proteins, silicones, polyurethanes, phenol formaldehyde, urea formaldehyde and melamine formaldehyde, wherein the polyurethane, the ethylenically unsaturated monomer and the polymeric performance enhancer are contacted in the presence of water, in the absence of a surfactant and in the absence of an organic solvent, under conditions effective to polymerize the ethylenically unsaturated monomer, thereby forming the aqueous polymeric dispersion comprising at least three discrete polymeric components.

4. The aqueous polymeric dispersion of claim 3 wherein the polymeric performance enhancer is selected from the group consisting of rosin acids, rosin esters, terpene phenolics, polyesters, amino resins, epoxy resins, polyamides, polyamines, polyanhydrides, polysaccharides, polyureas, phenol formaldehyde, urea formaldehyde, melamine formaldehyde, natural rubbers, epoxidized-rubbers and other functionalized rubbers.

5. The aqueous polymeric dispersion of claim 3 further comprising an auxiliary agent selected from the group consisting of crosslinkers, rheology modifiers, coalescent agents, pigments and plasticizers.

6. The aqueous polymeric dispersion of claim 5 selected from the group consisting of an adhesive, a binder, a glass size, a sealant, a saturant, a foam, a roof mastic, a fabric book coating, a paint and an ink.

7. An article of manufacture prepared from the dispersion of claim 3.

* * * * *